US00RE35507E

United States Patent [19]

Uchida et al.

[11] E Patent Number: Re. 35,507

[45] Reissued Date of Patent: May 13, 1997

[54] REPULSION TYPE CIRCUIT BREAKER CONTROL DEVICE

[75] Inventors: Naoshi Uchida; Kouji Asakawa; Jun Oyama, all of Kanagawa, Japan

[73] Assignee: Fuji Electric Co., Ltd., Kawasaki, Japan

[21] Appl. No.: 343,857

[22] Filed: Nov. 17, 1994

Related U.S. Patent Documents

Reissue of:

[64] Patent No.: 5,164,560
Issued: Nov. 17, 1992
Appl. No.: 778,364
Filed: Oct. 17, 1991

[30] Foreign Application Priority Data

Nov. 22, 1990 [JP] Japan ..... 2-318867

[51] Int. Cl.[6] ..... H01H 75/00

[52] U.S. Cl. ..... 335/16; 335/147; 218/22

[58] Field of Search ..... 335/16, 147, 195; 218/22

[56] References Cited

U.S. PATENT DOCUMENTS 4,539,538 9/1985 Flick et al. ..... 335/195
4,656,444 4/1987 McKee et al. ..... 335/16
4,733,211 3/1988 Castonguay et al. ..... 335/192

*Primary Examiner*—Lincoln Donovan
*Attorney, Agent, or Firm*—Finnegan, Henderson, Farabow, Garrett and Dunner, L.L.P.

[57] ABSTRACT

A repulsion type circuit breaker movable contact device comprising a first movable contact, an opening/closing mechanism which drives the first movable contact for opening and closing, a second movable contact for contacting the first movable contact, the second movable contact being freely pivotable and adapted to receive an electromagnetic repulsion force from said first movable contact, and a contact spring comprising a twisted coil spring disposed with its twisting fulcrum displaced from the rotational pivot of the second movable contact, the contact spring urging the second movable contact into contact with the first movable contact, whereby upon flow of a predetermined mount of electric current through the first and second movable contacts, the electromagnetic repulsion force moves the second movable contact apart from the first movable contact.

30 Claims, 3 Drawing Sheets

REPULSION TYPE CIRCUIT BREAKER CONTROL DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a repulsion type circuit breaker provided with a first movable contact which is opened and closed by an opening/closing mechanism and a second movable contact which is disconnected from the first movable contact by an electromagnetic repulsion force, specifically a contact device which is adapted so that upon extreme current flow disconnection of the second movable contact may not be obstructed by the contact spring which urges the first and second movable contacts together.

2. Discussion of the Related Art

FIGS. 4 and 5 both show the side view of the conventional contact device in a closed condition. In FIG. 4, the first movable contact 1 is pivotably secured to the main casing 2 by the holder (not shown) and driven for opening and closing by the opening/closing mechanism (not shown). The second movable contact 3 which comes in contact with the first movable contact 1 is V-shaped as viewed from the side and is pivotably secured at its comer to the second movable contact support 5 by the pivotal pin 4. The second movable contact support 5 is fixed to the main casing 2 with a screw 6. The second movable contact 3 is electrically connected to a terminal plate 8 at the power supply side with a lead wire 7, and the terminal plate 8 is fixed to the main casing 2 with a screw 9. The contact spring 10 comprises a double tortional twisted coil spring with two arms 10a fixed to the second movable contact support 5, a U-bent pan 10b engaged with the second movable contact 3, and a coil 10c between each arm 10a and the U-bent part 10b. The contact spring 10 is mounted about the pivotal pin 4. Thus, the contact spring 10 urges the second movable contact 3 in the clockwise direction toward the first movable contact 1 to maintain a required contact pressure. Contact edges 1a and 3a are provided respectively on the first movable contact 1 and the second movable contact 3.

FIG. 5 shows another example of the conventional contact device in which a compression coil spring used as the contact spring 10 is inserted between the bar type second movable contact 3 and the terminal plate 8. The second movable contact 3 is pivotably secured at its end to the second movable contact support 5 by the pivotal pin 4. Electrical connection between the second movable contact 3 and the second movable contact support 5 is maintained by sliding contact, and between the terminal plate 8 and the second movable contact support 5 by direct connection.

In the configurations shown in FIGS. 4 and 5, the current flows in opposite directions, as shown with arrowheads, in mutually parallel conductive parts of first movable contact 1 and second movable contact 3. An electromagnetic force is created by these currents causing first movable contact 1 and second movable contact 3 to repel each other. The repulsion type circuit breaker uses this electromagnetic repulsion force to turn second movable contact 3 in the counterclockwise direction against contact spring 10 to quickly disengage contact edges 1a and 3a when current flow reaches a predetermined mount. The circuit formed between contact edges 1a and 3a is thereby broken interrupting any large current flow such as a shorting current.

In such a repulsion type circuit breaker, when second movable contact 3 is disconnected by the electromagnetic repulsion force, contact spring 10 still urges the second movable contact 3 in opposition to the electromagnetic repulsion force used to open the circuit. In the case of the conventional circuit breaker, the amount of electromagnetic repulsion force required to overcome, the reactive force of contact spring 10 increases as the spring is compressed. The increasing force required to bend the spring has been a substantial obstacle in reducing the disconnection time of the second movable contact.

SUMMARY OF THE INVENTION

The present invention has been made in view of the above circumstances and has an object to provide a contact device of a repulsion type circuit breaker for which the reactive force of the contact spring is not substantially increased when the second movable contact is disconnected thereby quickening disconnection by electromagnetic repulsion force and thus improving current interruption performance.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the repulsion type movable contact device of this invention comprises a first movable contact, an opening/closing mechanism which drives the first movable contact for opening and closing, a second movable contact for contacting the first movable contact, the second movable contact being freely pivotable and adapted to receive an electromagnetic repulsion force from said first movable contact, and a contact spring comprising a twisted coil spring disposed with its [twisting fulcrum] *point of application for twisting* displaced from the rotational pivot of the second movable contact, the contact spring urging the second movable contact into contact with the first movable contact, whereby upon flow of a predetermined mount of electric current through the first and second movable contacts, the electromagnetic repulsion force moves the second movable contact apart from the first movable contact.

BRIEF DESCRIPTION OF THE DRAWINGS

The accompanying drawings, which are incorporated into and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Figure 1:
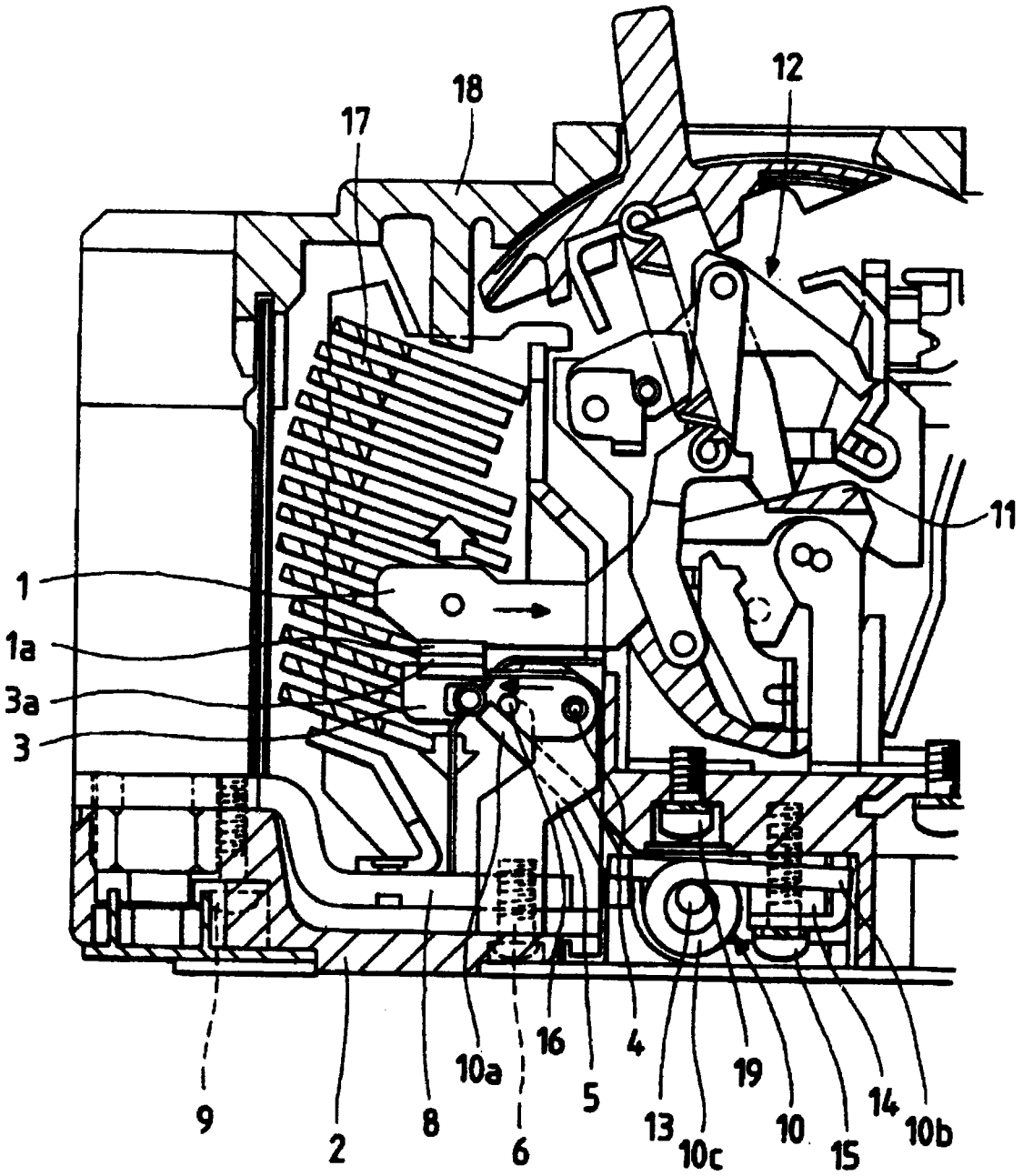
FIG. 1 is a cross-sectional view of an embodiment of the present invention showing the principal part of the repulsion type circuit breaker.

In the conventional construction, the length of the arm from the pivotal point of the second movable contact to the acting point of the resilient force of the contact spring is fixed and any increase of resilient force of the contact spring directly results in an increase of the reactive force against disconnection. In the present invention, the contact spring is formed with a twisted coil spring, and the [twisting fulcrum] *point of application twisting* is displaced from the pivotal point of the second movable contact to reduce the reactive force on the contact spring as the second movable contact is disconnected from the first movable contact.

To cause the resilient force of the contact spring to act on the second movable contact, the device can be constructed so that a pin is planted in the second movable contact and engaged with the arm of the contact spring.

In the conventional construction, the contact spring which comprises a twisted coil spring is mounted on the pivotal pin of the second movable contact. Therefore, the length of the arm of the spring from the pivotal pin to the acting point of the resilient force of the contact spring is substantially fixed. When the contact spring is twisted due to disconnection of the second movable contact from the first movable contact and the resilient force of the spring increases, such increase directly results in an increase of reactive force against disconnection of the second movable contact. In addition, the turning angle of the second movable contact and the deforming angle due to twisting of the contact spring along with disconnection coincide with each other and therefore the reactive force increases in approximate proportion to the opening distance of the second movable contact.

On the other hand, the configuration in accordance with the present invention allows the length of the arm from the pivotal point of the second movable contact to the acting point of the resilient force of the contact spring to be reduced when the second movable contact turns. This reduction is accomplished by displacing the turning fulcrum of the contact spring from the pivotal point of the second movable contact. Thus, the reactive force exerted by the contact spring is reduced as compared to that of the conventional device during rotation of the second movable contact. Furthermore, the twisting deformation angle of the contact spring can be controlled to be smaller than the turning angle of the second movable contact, thereby further reducing the reactive force required to disengage the second movable contact.

If the contact device is constructed so that the pin planted in the second movable contact engages with the arm of the contact spring in order to make the resilient force of the contact spring act on the second movable contact, the portion of the ann between the contact spring turning fulcrum and the pin is reduced during rotational disconnection of the second movable contact.

The present invention provides a circuit breaker with a high current breaking capacity which can use the electromagnetic repulsion force to the maximum extent since the reactive force of the contact spring against the electromagnetic repulsion force is reduced compared to conventional device during disconnection of the second movable contact.

Figure 4:
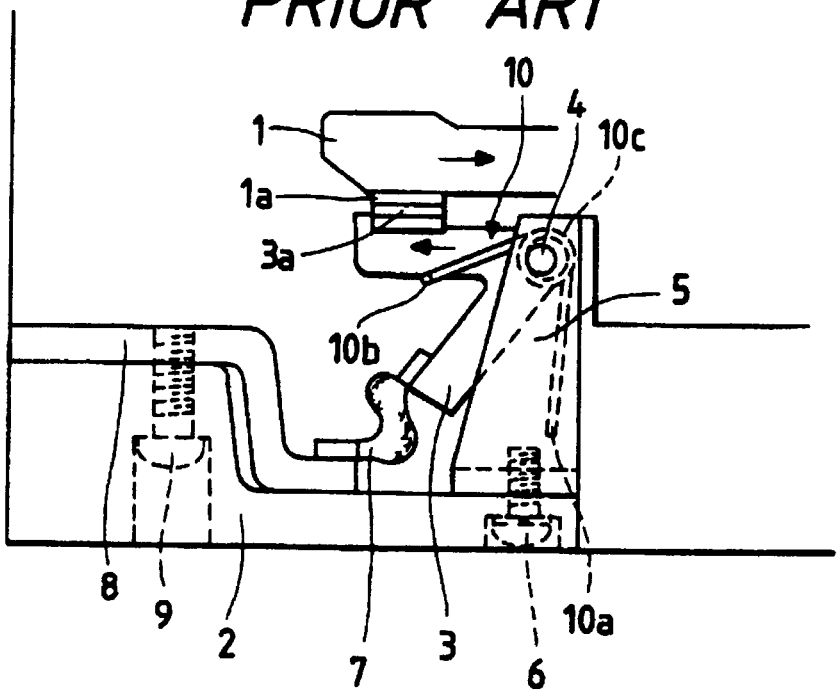
FIG. 4 PRIOR ART
FIG. 4 is a side view of an example of the conventional contact device.
Figure 5:
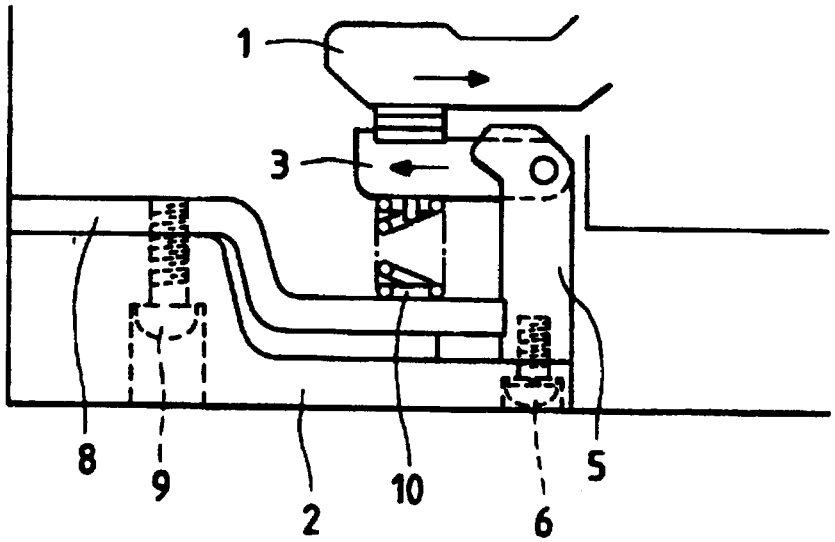
FIG. 5 PRIOR ART
FIG. 5 is a side view of another example of the conventional contact device.
Figure 2A:
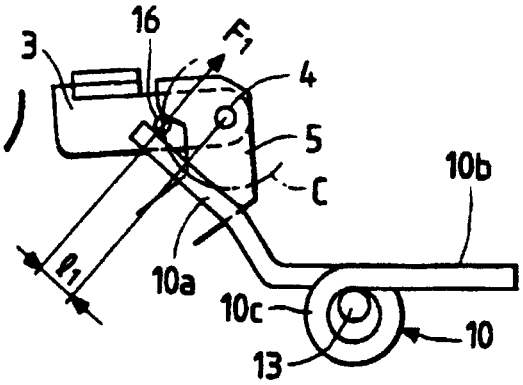
FIG. 2(A) is a side view of an embodiment of the present invention showing the contact device of the circuit breaker in a closed condition.
Figure 2B:
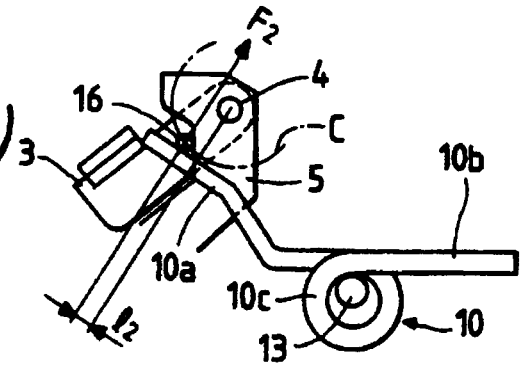
FIG. 2(B) is a side view of an embodiment of the present invention showing the contact device of the circuit breaker in an opened condition.
Figure 3:
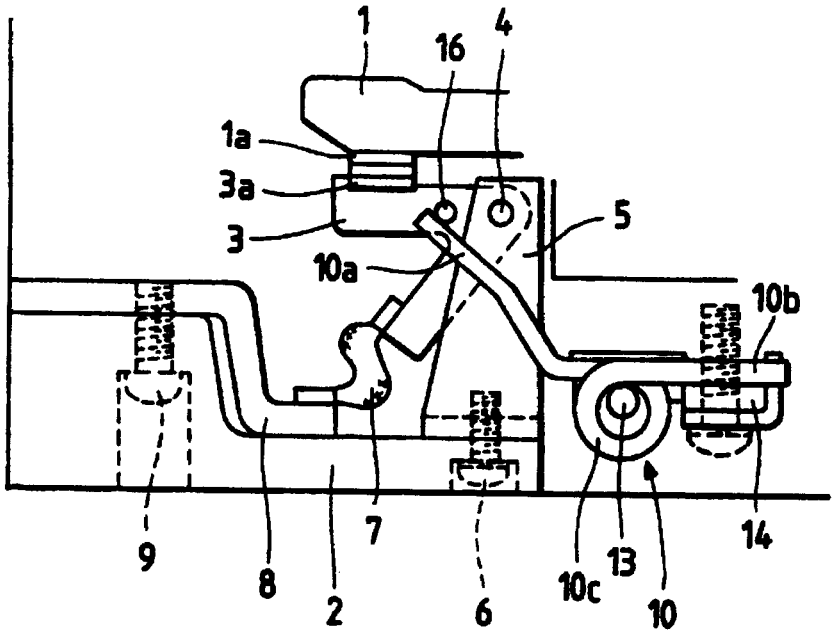
FIG. 3 is a side view of another embodiment of the of present invention.

The following describes the preferred embodiments of the present invention shown in FIGS. 1 through 3. The reference numerals are used to represent parts corresponding to the examples of the conventional device shown in FIGS. 4 and 5.

FIG. 1 is a cross-sectional view of the principal partof the repulsion type circuit breaker provided with the contact device in accordance with the present invention in a closed position. A first movable contact 1 is pivotably secured by a holder 11 to a main casing 2 which is made of molded resin. The opening/closing mechanism 12 drives the first movable contact 1 around holder 11. Holder 11 thus acts as a fulcrum for the first movable contact 1. A second movable contact 3 which comes in contact with first movable contact 1 via contact edges 1a and 3a is pivotably secured to a pair of right and left second movable contact supports 5 by a pivotal pin 4. Second movable contact supports 5, which slidingly contact second movable contact 3 from right and left sides, are coupled by brazing to both sides of a terminal plate 8 at the power supply side. Terminal plate 8 is fixed to main using 2 with screws 6 and 9.

A contact spring 10, which energizes the second movable contact 3 in the clockwise direction to provide contact pressure between first movable contact 1 and second movable contact 3, may comprise a double torsional twisted coil spring. Contact spring 10 is U-shaped with two arms 10a, a U-shaped portion 10b, and a coil 10c between the U-shaped portion 10b and each arm 10a. A support pin 13 which secures contact spring 10 to a spring block 14 at coil 10c is displaced from pivotal pin 4. A spring block 14 is fixed to main casing 2 with a screw 15. U-shaped portion 10b of contact spring 10 is fixed to spring block 14, and arms 10a are engaged with the right and left protruding ends of pin 16 which is planted in second movable contact 3. An arc suppressing chamber 17 is arranged to surround the first and second movable contacts 1 and 3, and a molded resin cover 18 is fitted to main casing 2.

When a large current such as a shorting current flows through a circuit breaker as described above, a large electromagnetic repulsion force (shown with large unshaded arrowheads) acts between the currents flowing in opposite directions in first movable contact 1 and second movable contact 3 (shown with thin arrowheads). Before first movable contact 1 is driven by opening/closing mechanism 12, second movable contact 3 is driven in the counterclockwise direction to be disconnected from first movable contact 1. In this case, pin 16 slides along the arms 10a towards coil 10c while contact spring 10 is slightly twisted and deformed in the counterclockwise direction. The location of pin 16 before and after rotation of second movable contact 3 is shown in FIGS. 2(A) and 2(B), respectively.

FIG. 2 illustrates the function of this configuration in accordance with the present invention. FIG. 2(A) shows the closed condition of the embodiment, and FIG. 2(B) shows the opened condition of the embodiment. In FIG. 2(A), since the coefficient of friction between pin 16 and arms 10a of contact spring 10 is extremely small, the force exerted by contact spring 10 acts at approximately right angles to pin 16. Assuming that this force is $F_1$ and that the length of arms 10a from pivotal point 4 to pin 16 which is the acting point of force $F_{l1}$, the [angular movement in the clockwise direction] *rotation movement for clockwise motion* which acts on second movable contact 3 under the closed condition is $F_1 \times l_1$. In FIG. 2(B), similarly, assuming that the force exerted by contact spring 10 and that the length of the arm up to the point of action are $F_2$ and $l_2$, respectively, the [angular movement in the clockwise direction] *rotation moment for clockwise motion* which acts on the second movable contact 3 upon disconnection is $F_2 \times l_2$.

When contact spring 10 is twisted and deformed in the counterclockwise direction with support pin 13 acting as a [twisting fulcrum] *point of application for twisting.*, $F_1$ is smaller than $F_2$. However, arms 10a of contact spring 10 are only positioned slightly inside the movement arc C, of pin 16 and, therefore, the twisting deformation angle of contact spring 10 around support pin 13 is smaller than the turning angle of second movable contact 3. For this reason, $F_2$ is not substantially greater than $F_1$, whereas the increase in force is much more in a conventional device since the coil of the spring is mounted on the rotational pin of the second movable contact thus requiring more spring deformation.

Furthermore, the active length $l_2$ of arms 10a after disconnection becomes far smaller than $l_1$, as shown, since pin 16 moves along arms 10a of contact spring 10. Consequently, the magnitude of the [angular] *rotation* moments in FIGS. 2(A) and 2(B), respectively, appears as $F_{1\times l1}>F_2\times l_2$, and this reaction of contact spring 10 is reduced during disconnection and separation of second movable contact 3.

Referring to FIG. 3 showing another embodiment of the present invention, second movable contact 3 and terminal plate 8 are electrically connected with a lead wire 7 instead of a sliding contact between second movable contact 3 and movable contact supports 5. The descriptions of other configurations and functions are omitted since they are similar to that shown in FIG. 1.

As described above, the configuration of FIGS. 1–3 provides quicker disconnection of the second movable contact than conventional contact device since the reactive force from contact spring 10 is reduced as the second movable contact 3 is driven and disconnected by the electromagetic repulsion force. In addition, the acting point of the resilient force of the contact spring 10 can be smoothly shifted during disconection by planting pin 16 in the second movable contact 3 and engaging it with arms 10a of contact spring 10.

The foregoing description of preferred embodiments of the invention has been presented for purposes of illustration and description. It is not intended to be exhaustive or to limit the invention to the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A repulsion type circuit breaker movable contact device comprising:

a first movable contact;

an opening/closing mechanism operably attached to said first movable contact for driving said first movable contact between an open and a closed position;

a second movable contact for contacting said first movable contact when said first movable contact is in said closed position, said second movable contact being freely pivotable and adapted to receive an electromagnetic repulsion force from said first movable contact; and a twisted torsional coil contact spring disposed with its [twisting fulcrum] *point of application for twisting* displaced from the rotational pivot of said second movable contact, said contact spring urging said second movable contact into contact with said first movable contact, whereby upon flow of a predetermined amount of electric current through said first and second movable contacts, the electromagnetic repulsion force moves said second movable contact apart from said first movable contact.

2. A repulsion type circuit breaker movable contact device as in claim 1, wherein a pin is disposed in said second movable contact and an arm of said contact spring is engaged with said pin.

3. A repulsion type circuit breaker movable contact device as in claim 1, wherein a pin is disposed in said second movable contact and said contact spring includes a U-shaped portion, two arms and a coil disposed between said U-shaped portion and each of said arms, each of said arms engaged with said pin.

4. A repulsion type circuit breaker movable contact device as in claim 1, wherein said second movable contact is freely pivotable about a rotation [peg] *pin disposed at the rotational pivot and* secured by at least one movable contact support from which said second movable contact receives electrical current through sliding contact.

5. A repulsion type circuit breaker movable contact device as in claim 2, wherein said second movable contact is freely pivotable about a rotationn [peg] *pin disposed at the rotational pivot and* secured by at least one movable contact support from which said second movable contact receives electrical current through sliding contact.

6. A repulsion type circuit breaker movable contact device as in claim 3, wherein said second movable contact is freely pivotable about a rotation [peg] *pin disposed at the rotational pivot and* secured by at least one movable contact support from which said second movable contact receives electrical current through sliding contact.

7. A repulsion type circuit breaker movable contact device as in claim 1, wherein a lead wire connected to said second movable contact provides electrical current to said second movable contact.

8. A repulsion type circuit breaker movable contact device as in claim 2, wherein a lead wire connected to aid second movable contact provides electrical current to aid second movable contact.

9. A repulsion type circuit breaker movable contact device as in claim 3, wherein a lead wire connected to said second movable contact provides electrical current to said second movable contact.

10. A repulsion type circuit breaker movable contact device as in claim 2, wherein upon the moving apart of the first and second movable contacts, said pin slides along said arm towards said contact spring [twisting fulcrum] *point of application for twisting*.

11. A replusion type circuit breaker movable contact device as in claim 3, wherein upon the moving apart of the first and second movable contacts, said pin slides along said arms towards said contact spring coil.

12. A repulsion type circuit breaker movable contact device as in claim 1, wherein said contact spring exerts a force and [an annular] *a rotational* moment on said second movable contact, the [annular] *rotation* moment decreasing upon movement of contact, the said second movable contact by the electromagnetic repulsion force.

*13. A repulsion type circuit breaker movable contact device comprising:*

*an opening/closing mechanism operably attached to said first movable contact for driving said first movable contact between an open position and a closed position;*

*second movable contact for contacting said first movable contact when said first movable contact is in said*

*closed position, said second movable contact being freely pivotable and adapted to receive an electromagnetic repulsion force from said first movable contact; and*

*a contact pressure applying member for applying a contact force to urge said second movable contact into contact with said first movable contact, wherein the flow of a predetermined amount of electric current through said first and second movable contacts produces the electromagnetic repulsion force with sufficient magnitude to move said second movable contact apart from said first movable contact, and wherein said contact pressure applying member exerts an annular moment on said second movable contact, the annular moment decreasing upon movement of said second movable contact by the electromagnetic repulsion force.*

*14. A repulsion type circuit breaker movable contact device as in claim 13, further including a pin disposed in said second movable contact and an arm provided on said contact pressure applying member in engagement with said pin.*

*15. A repulsion type circuit breaker movable contact device as in claim 13, further including a pin disposed in said second movable contact, a U-shaped portion on said contact pressure applying member, two arms engaged with said pin, and a coil disposed between said U-shaped portion and each of said arms.*

*16. A repulsion type circuit breaker movable contact device as in claim 13, wherein said second movable contact is freely pivotable about a rotation pin disposed at the rotational pivot of said second movable contact and secured by at least one movable contact support, said second movable contact receiving electrical current through sliding contact.*

*17. A repulsion type circuit breaker movable contact device as in claim 14, wherein said second movable contact is freely pivotable about a rotation pin disposed at the rotational pivot of said second movable contact and secured by at least one movable contact support, said second movable contact receiving electrical current through sliding contact.*

*18. A repulsion type circuit breaker movable contact device as in claim 15, wherein said second movable contact is freely pivotable about a rotation pin disposed at the rotational pivot of said second movable contact and secured by at least one movable contact support, said second movable contact receiving electrical current through sliding contact.*

*19. A repulsion type circuit breaker movable contact device as in claim 13, further including a lead wire connected to said second movable contact to provide electrical current to said second movable contact.*

*20. A repulsion type circuit breaker movable contact device as in claim 14, further including a lead wire connected to said second movable contact to provide electrical current to said second movable contact.*

*21. A repulsion type circuit breaker movable contact device as in claim 15, further including a lead wire connected to said second movable contact to provide electrical current to said second movable contact.*

*22. A repulsion type circuit breaker movable contact device as in claim 14, wherein said contact pressure applying member has a point of application for twisting, and wherein upon the moving apart of the first and second movable contacts, said pin slides along said arm towards said point of application for twisting.*

*23. A repulsion type circuit breaker movable contact device as in claim 15, wherein said contact pressure applying member includes a coil, and wherein upon the moving apart of the first and second movable contacts, said pin slides along said arms towards said coil.*

*24. A repulsion type circuit breaker movable contact device comprising:*

*a first movable contact;*

*an opening/closing mechanism operably attached to said first movable contact for driving said first movable contact between an open and a closed position;*

*a second movable contact for contacting said first movable contact when said first movable contact is in said closed position, said second movable contact being adapted to receive an electromagnetic repulsion force from said first movable contact; and*

*a force application member for applying a contact force to urge said second movable contact into contact with said first movable contact, the electromagnetic repulsion force moving said second movable contact apart from said first movable contact in opposition to the contact force upon flow of a predetermined amount of electric current through at least one of said first and second movable contacts, and said force application member applying the contact force to said second movable contact, within a time period after initial separation of said first and second movable contacts in response to the repulsion force, such that the contact force decreases as the distance between said first movable contact and said second movable contact increases.*

*25. A repulsion type circuit breaker movable contact device as in claim 24, wherein the rotation moment due to the contact force applied to said second movable contact by said force application member gradually decreases in correspondence with a degree of disconnecting said second movable contact from said first movable contact.*

*26. A repulsion type circuit breaker movable contact device as in claim 24, wherein the force application member comprises a contact spring.*

*27. A repulsion type circuit breaker movable contact device as in claim 26, wherein said second movable contact has a rotational pivot, and said contact spring has a point of application for twisting displaced from the rotational pivot of said second movable contact.*

*28. A repulsion type circuit breaker movable contact device as in claim 27, wherein said contact spring includes an arm and a coil contact spring, and said second movable contact includes a pin, said arm of said contact spring being engaged with said pin, and upon the moving apart of said first and second contacts, said pin slides along said arm towards said contact spring coil.*

*29. A repulsion type circuit breaker movable contact device as in claim 26, wherein said contact spring exerts a force and an annular moment on said second movable contact, the annular moment decreasing upon movement of said second movable contact by the electromagnetic repulsion force.*

*30. A repulsion type circuit breaker movable contact device as in claim 24, wherein said force application member comprises a twisted torsional coil contact spring.*

* * * * *

UNITED STATES PATENT AND TRADEMARK OFFICE

CERTIFICATE OF CORRECTION

PATENT NO.: Re 35,507

DATED: May 13, 1997

INVENTOR(S): Naoshi UCHIDA et al.

It is certified that an error appears in the above-identified patent and that said Letters Patent is hereby corrected as shown below:

Claim 5, col. 6, line 23, "rotationn" should read --rotation--.

Claim 8, col. 6, line 39, "aid" should read --said--.

Claim 12, col. 6, line 56, "rotational" should read --rotation--.

Claim 13, col. 6, line 61, after "comprising:" insert the following line --a first movable contact;-- and line 66, before "second" insert --a--.

Signed and Sealed this

Second Day of December, 1997

*Attest:*

*Attesting Officer*

BRUCE LEHMAN

*Commissioner of Patents and Trademarks*